Sept. 25, 1934.  R. CHILTON  1,974,803
VENTING OF CRANK CASES
Filed May 25, 1931
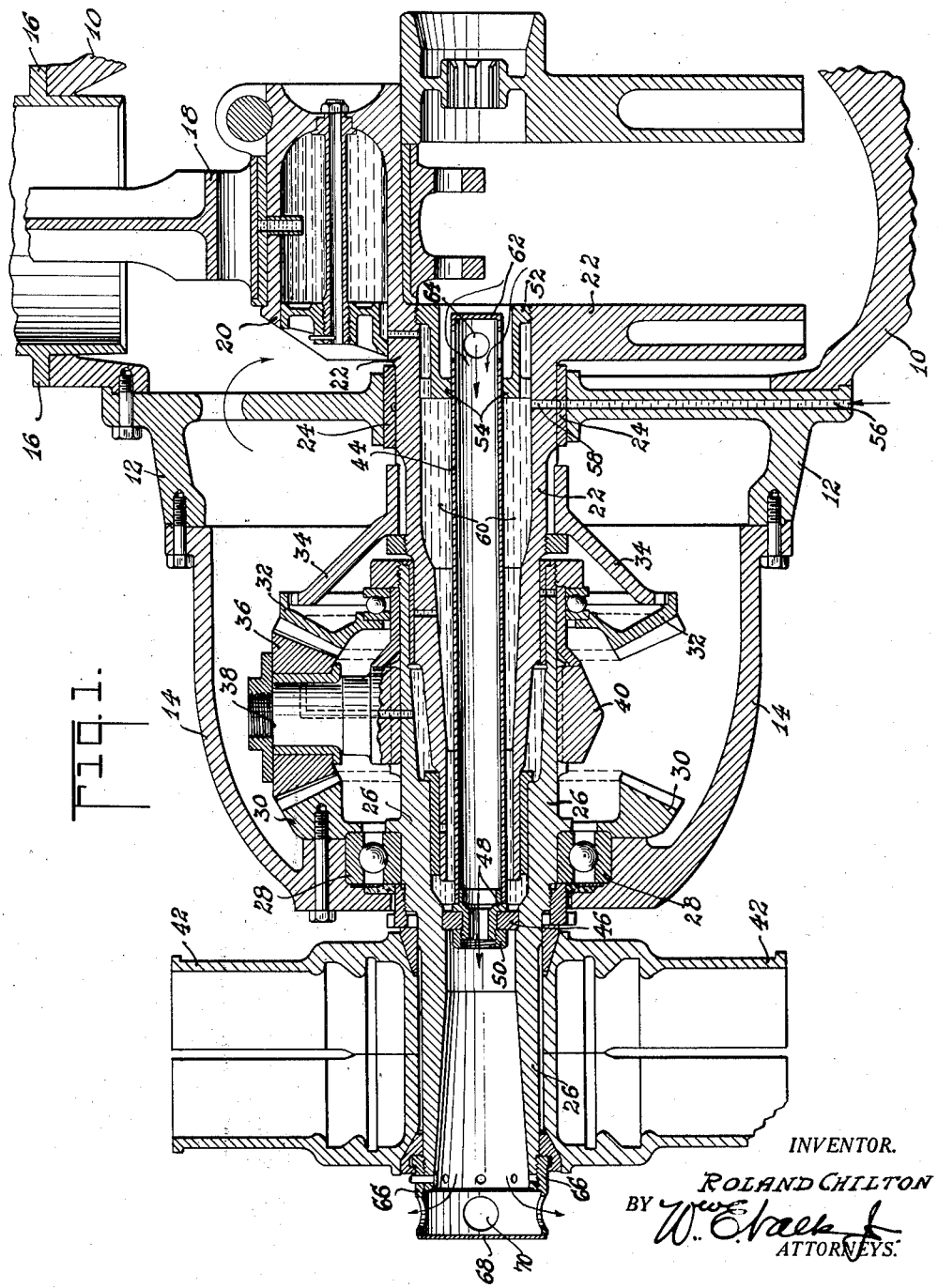
INVENTOR.
ROLAND CHILTON
BY
ATTORNEYS.

Patented Sept. 25, 1934

1,974,803

UNITED STATES PATENT OFFICE 1,974,803

VENTING OF CRANK CASES

Roland Chilton, Ridgewood, N. J., assignor to Wright Aeronautical Corporation, a corporation of New York Application May 25, 1931, Serial No. 539,836

11 Claims. (Cl. 121—194)

This invention relates to a new and improved venting means for engine crankcases, and the like.

In pressure lubricated engines, and particularly in aircraft engines, there is a great quantity of oil spray in the crankcase coupled with violent air pulsations from the pistons. To prevent internal condensation and corrosion of the parts, and to provide an escape for gases leaking by the pistons, the case must be vented to the atmosphere; and great trouble has been experienced preventing the escape of oil from these vents. Elaborate labyrinths and baffles have been tried, but as the vapor velocity or pulsations thru the vent are often quite high, these devices are not effective.

The rotating crankshaft sets the air and the entrained oil particles in the crankcase into rotation, developing centrifugal force tending to leakage at any breather placed on the perimeter of the case. Such centrifugal force, however, tends to throw the oil particles away from the center of rotation and accordingly in this invention the breather is placed centrally of the crankshaft itself, which has been found by test to be effective in preventing leakage.

In aircraft engines the rear end of the crankshaft is usually covered by a supercharger, starter, or other accessory, so that only the front or propeller end of the shaft is available for breathing. In many cases this end of the shaft is hollow, and for a part of its length at least comprises part of the lubrication system of the engine, being full of oil under pressure. In geared engines this is almost always the case, and with concentric gearing, the propeller shaft comprises an extension of the crankshaft running at reduced speed, which involves an added problem in providing for an axial vent to the atmosphere without risk of oil leakage outside of the engine. Such an engine has accordingly been chosen for the preferred embodiment of the drawing in which, Fig. 1 is a partial transverse axial section thru the crankshaft and gear mechanism of an engine embodying the breather of this invention.

The engine casing to be vented, which, as a whole, is adapted to contain oil for lubrication of the engine parts, consists of the crankcase 10, the intermediate section 12, and the nose section 14. The base of a cylinder is indicated at 16 and the end of the associated connecting rod at 18 engaging a crankpin 20 of the crankshaft 22 which extends forwardly thru the bearing 24. Journaled on this extension is the hollow propeller shaft 26, also supported in the bearing 28 in the nose piece 14. In this instance the reduction gear comprises the fixed gear 30 and the driving gear 32, which is driven from the crankshaft by the member 34. Engaged between these gears are bevel pinions, one of which is seen at 36 journaled on an arm 38 of a spider 40 splined to the propeller shaft 26 which may carry the conventional propeller hub 42.

The conventional breather disposition is on top of the nose section of gear-case 14 and, due to the churning action of the gear and the pressures and pulsations previously referred to, oil leakage at such breathers has been a frequent source of trouble. In such conventional engines the forward end of the hollow propeller shaft 26 is fitted with a tight plug so that the interior of the shaft may be used to convey oil under pressure to all the gear parts.

One object of the present invention is to provide for an axial vent without disturbing the lubrication system or endangering oil leaks. Accordingly, a vent tube 44 is tightly secured in the propeller shaft 26 as by the plug ring 46 in which is secured the sleeve 48 by means of the nut 50. The vent tube 44 is welded or otherwise secured to the sleeve 48 and extends into the hollow oil plug cap 52 of the crankshaft, the bearing at 54 being a running fit to permit of the difference in rotational speed between the crankshaft 22 and the propeller shaft 26, with which latter shaft the vent tube revolves.

The pressure oil has been indicated by horizontal dotted shading and may be taken as entering at the hole 56, whence it enters the crankshaft by the bearing 24 and the hole 58, filling the space 60 between the breather tube 44 and the hollow crankshaft extension 22. Suitable holes are provided to lead the oil to the gear and other bearings.

The inner end of the vent tube 44 is preferably capped at 62 to prevent direct splashing of oil into the tube, and holes 64 are provided which open into the space within the hollow oil sealing cap 52. It will now be seen that the only additional point for pressure oil leakage is at the bearing 54 at the inner end of the tube, and that such leakage will be inside the crankcase where it will do no harm; and it will be appreciated that this result is achieved by tightly securing the vent tube 44 for rotation with the propeller shaft 26.

Due to the rapid rotation of the crankshaft, the oil particles are thrown away from the center of rotation where the vent tube 44 emerges, and the rotation of this tube itself further assists in preventing oil particles from entering the holes 64.

The propeller hub 42 is secured by a nut 66 preferably provided with a cap 68, and radial outlet vent holes 70, in order to prevent direct air pressure in the crankcase when in flight. It is now apparent that the vent holes 70, the outer bore of the propeller shaft 26, the bore of the vent tube 44 and the holes 64 combine to form a free vent passage from the interior of the casing to the outside air.

While the specific embodiment of the drawing shows the device of this invention embodied in a radial aircraft engine having a concentric reduction gear, it will be understood that the device may be applied to any rotating shaft extending from an oil retaining casing to be ventilated.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an engine, a casing requiring ventilation, a hollow power shaft within said casing, a hollow propeller shaft geared to said power shaft, in axial alinement with said power shaft and protruding from said casing, and a tube within the hollow of said propeller shaft and extending into the hollow of said power shaft, said tube providing an air vent passage from said casing to the outside air.

2. In an engine, a casing requiring ventilation, a hollow power shaft within said casing, a hollow propeller shaft geared to said power shaft, in axial alinement with said power shaft and protruding from said casing, a tube fixed within the hollow of said propeller shaft and extending into the hollow of said power shaft, said tube providing an air vent passage from said casing to the outside air, and a bearing within the hollow of said power shaft engaging said tube.

3. In an engine, a casing requiring ventilation, a hollow power shaft lying within said casing, a hollow propeller shaft geared to said power shaft, in axial alinement with said power shaft and protruding from said casing, and a tube within the hollow of each of said shafts, the bore of said tube providing an air vent passage from said casing to the outside air.

4. In an engine, a casing requiring ventilation, a hollow power shaft lying within said casing, a hollow propeller shaft geared to said power shaft, in axial alinement with said power shaft and protruding from said casing, a tube fixed within the hollow of said propeller shaft and extending into the hollow of said power shaft, the bore of said tube providing an air vent passage from said casing to the outside air, and a bearing within said power shaft engaging said tube, said bearing providing an end closure for the hollow of said shaft.

5. In an engine, a casing requiring ventilation, a hollow power shaft within said casing, a hollow propeller shaft geared to said power shaft, in axial alinement with said power shaft and protruding from said casing, a tube within the hollow of said propeller shaft and extending into the hollow of said power shaft, said tube providing an air vent passage, and end closures for said passage having formed adjacent thereto radially extending openings, open respectively to said casing and to the outside air.

6. In an engine, a casing requiring ventilation, a hollow power shaft within said casing, a hollow propeller shaft geared to said power shaft, in axial alinement with said power shaft and protruding from said casing, a tube fixed within the hollow of said propeller shaft and extending into the hollow of said power shaft, said tube providing an air vent passage, a bearing within the hollow of said power shaft engaging said tube, and end closures for said passage having formed adjacent thereto radially extending openings, open respectively to said casing and to the outside air.

7. In an engine, a casing requiring ventilation, a hollow power shaft lying within said casing, a hollow propeller shaft geared to and in axial alinement with said power shaft and extending from said casing, a tube within the hollows of said shafts, the bore of said tube providing an air vent passage, and closures for said passage having formed adjacent thereto radially extending openings, open respectively to said casing and to the outside air.

8. In an engine, a casing requiring ventilation, a hollow power shaft lying within said casing, a hollow propeller shaft, in axial alinement with said power shaft and protruding from said casing, a tube fixed within the hollow of said propeller shaft and extending into the hollow of said power shaft, the bore of said tube providing an air vent passage, a bearing within said power shaft engaging said tube, said bearing providing an end closure for the hollow of said shaft, and end closures for said passage having formed adjacent thereto radially extending openings, open respectively to said casing and to the outside air.

9. In an engine, a casing requiring ventilation, a hollow power shaft within said casing, a hollow propeller shaft geared to said power shaft, in axial alignment therewith and protruding from said casing, and a tube extending into the hollows of both said shafts, said tube being open at its ends, respectively, to said casing and to the outside air to provide a vent passage for said casing.

10. In an engine, in combination, a casing, a hollow shaft carried therein for rotation, a tube within the hollow of said shaft for defining a pair of substantially concentric passages, means for supplying oil to one said passage, means for directing oil from said passage to the interior of said casing, and means associated with said tube for establishing said other passage as a vent between the interior of said casing and the outside air.

11. In an engine requiring lubrication and having a casing requiring ventilation, a hollow shaft extending through said casing, a tube within the hollow of said shaft, means for holding said tube substantially concentric with said shaft for defining an annular passage between said shaft and the outer wall of said tube, means for directing oil into said annular passage, said shaft having openings therein for permitting oil to flow from said passage to the interior of said casing, said tube holding means including an end closure for said annular passage, the bore of said tube being open toward its ends to provide an air vent passage from the interior of said casing to the outside air.

ROLAND CHILTON.